(12) United States Patent
Ellgas et al.

(10) Patent No.: US 10,814,732 B2
(45) Date of Patent: Oct. 27, 2020

(54) METHOD AND CENTRAL CONTROL SYSTEM FOR CONTROLLING THE ELECTRICAL CHARGING OF A GROUP OF VEHICLES

(71) Applicant: Bayerische Motoren Werke Aktiengesellschaft, Munich (DE)

(72) Inventors: Simon Ellgas, Mountain View, CA (US); Enrique Marcial-Simon, Veitshoechheim (DE); Thomas Stauner, Unterschleissheim (DE); Rainer Mehlhorn, Landsham (DE); Xaver Pfab, Herdweg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 149 days.

(21) Appl. No.: 16/109,920

(22) Filed: Aug. 23, 2018

(65) Prior Publication Data
US 2018/0361869 A1   Dec. 20, 2018

Related U.S. Application Data

(63) Continuation of application No. PCT/EP2016/079916, filed on Dec. 6, 2016.

(30) Foreign Application Priority Data

Feb. 24, 2016   (DE) .................. 10 2016 202 816

(51) Int. Cl.
*B60L 58/13* (2019.01)
*B60L 53/14* (2019.01)
(Continued)

(52) U.S. Cl.
CPC ........... *B60L 53/14* (2019.02); *B60L 11/1844* (2013.01); *B60L 53/53* (2019.02); *B60L 53/63* (2019.02);
(Continued)

(58) Field of Classification Search
CPC .... B60L 11/1844; B60L 53/64; B60L 53/665; B60L 53/53; B60L 53/65; B60L 53/63;
(Continued)

(56) References Cited

U.S. PATENT DOCUMENTS

| 7,184,903 B1 | 2/2007 | Williams et al. |
| 2008/0039980 A1 | 2/2008 | Pollack et al. |

(Continued)

FOREIGN PATENT DOCUMENTS

| DE | 10 2011 003 993 A1 | 8/2011 |
| DE | 10 2011 109 422 A1 | 2/2013 |

(Continued)

OTHER PUBLICATIONS

Malhotra et al., "Use Cases for Stationary Battery Technologies: A Review of the Literature and Existing Projects", Renewable and Sustainable Energy Reviews, 2016, pp. 705-721, vol. 56, XP029387113 (17 pages).

(Continued)

*Primary Examiner* — Robert E Fennema
*Assistant Examiner* — Jigneshkumar C Patel
(74) *Attorney, Agent, or Firm* — Crowell & Moring LLP

(57) ABSTRACT

A method controls the electric charging of a group of vehicles. A central control system can communicate with the respective vehicles of the group and with a server of the network operator. In each case a charging time window, a departure time and a setpoint state of charge of the vehicle-side energy store at the departure time are defined in advance for one or more specific vehicles. In addition, a cost value for the charging time window is predefined in accordance with a cost function which specifies a cost level as a function of the charging process according to the charging time window. The central control system transmits a modified charging time window to a respective specific vehicle of at (Continued)

least some of the specific vehicles, after which the charging process is carried out according to the modified charging time window by fulfilling the charging time criterion with an unchanged departure time and setpoint state of charge. The modified charging time window comprises at least one time period which occurs before the start of the non-modified charging time window, wherein the cost value according to the cost function for the modified charging time window is precisely as high as or is lower than the cost value for the non-modified charging time window.

18 Claims, 6 Drawing Sheets

(51) Int. Cl.

| | | |
|---|---|---|
| *B60L 53/63* | (2019.01) | |
| *B60L 53/65* | (2019.01) | |
| *B60L 53/53* | (2019.01) | |
| *B60L 53/66* | (2019.01) | |
| *B60L 53/64* | (2019.01) | |
| *G05B 19/042* | (2006.01) | |
| *B60L 11/18* | (2006.01) | |

(52) U.S. Cl.
CPC ............... *B60L 53/64* (2019.02); *B60L 53/65* (2019.02); *B60L 53/665* (2019.02); *G05B 19/042* (2013.01); *B60L 2240/70* (2013.01); *B60L 2250/14* (2013.01); *G05B 2219/2639* (2013.01); *Y02E 60/721* (2013.01); *Y02T 10/7005* (2013.01); *Y02T 10/705* (2013.01); *Y02T 10/7044* (2013.01); *Y02T 10/7088* (2013.01); *Y02T 10/7291* (2013.01); *Y02T 90/121* (2013.01); *Y02T 90/128* (2013.01); *Y02T 90/14* (2013.01); *Y02T 90/16* (2013.01); *Y02T 90/163* (2013.01); *Y02T 90/168* (2013.01); *Y02T 90/169* (2013.01); *Y04S 10/126* (2013.01); *Y04S 30/12* (2013.01); *Y04S 30/14* (2013.01)

(58) Field of Classification Search
CPC ...... B60L 53/14; B60L 58/13; B60L 2250/14; B60L 2240/70; Y02E 60/721; Y02T 10/7044; Y02T 10/705; Y02T 90/121; Y02T 10/7005; Y02T 90/163; Y02T 90/16; Y02T 90/169; Y02T 90/128; Y02T 10/7088; Y02T 90/168; Y02T 90/14; Y02T 10/7291; Y04S 30/14; Y04S 10/126; Y04S 30/12; G05B 2219/2639; G05B 19/042
USPC .......................................................... 700/295
See application file for complete search history.

(56) References Cited

U.S. PATENT DOCUMENTS

| | | |
|---|---|---|
| 2008/0040479 A1 | 2/2008 | Bridge et al. |
| 2010/0134067 A1 | 6/2010 | Baxter et al. |
| 2010/0301809 A1 | 12/2010 | Bhade et al. |
| 2011/0202221 A1 | 8/2011 | Sobue et al. |
| 2012/0235646 A1 | 9/2012 | Lo et al. |
| 2013/0002188 A1 | 1/2013 | Uyeki |
| 2013/0057211 A1 | 3/2013 | Kuribayashi et al. |
| 2013/0124002 A1 | 5/2013 | Greene et al. |
| 2013/0211988 A1 | 8/2013 | Dorn et al. |
| 2014/0084874 A1 | 3/2014 | Eger et al. |
| 2014/0203077 A1* | 7/2014 | Gadh ....................... H02J 7/00 235/382 |
| 2014/0361745 A1 | 12/2014 | Nishita et al. |
| 2015/0298567 A1 | 10/2015 | Uyeki |
| 2015/0346697 A1 | 12/2015 | Mailloux et al. |
| 2016/0009192 A1 | 1/2016 | Zhang et al. |
| 2016/0052413 A1 | 2/2016 | Shimizu et al. |
| 2016/0332527 A1* | 11/2016 | North .................. B60L 11/1844 |
| 2017/0166219 A1 | 6/2017 | Jammoussi et al. |

FOREIGN PATENT DOCUMENTS

| | | |
|---|---|---|
| DE | 10 2012 103 208 A1 | 10/2013 |
| DE | 10 2013 000 981 A1 | 7/2014 |
| DE | 11 2012 005 488 T5 | 10/2014 |
| WO | WO 2012/149965 A1 | 11/2012 |
| WO | WO 2012/163396 A1 | 12/2012 |
| WO | WO 2014/083425 A2 | 6/2014 |

OTHER PUBLICATIONS

Jossen et al. Moderne Akkumulatoren richtig einsetzen 1. Ausgabe, Reichardt Verlag Untermeitingen, 2006, pp. 148-149 (three (3) pages).
English translation of document C3 (German-language Office Action previously filed on Aug. 23, 2018) (seven (7) pages).
United States Notice of Allowance issued in U.S. Appl. No. 16/109,863 dated Nov. 13, 2019 (19 pages).
International Search Report (PCT/ISA/210) issued in PCT Application No. PCT/EP2016/079920 dated Feb. 22, 2017 with English translation (seven pages).
German-language Written Opinion (PCT/ISA/237) issued in PCT Application No. PCT/EP2016/079920 dated Feb. 22, 2017 (nine pages).
German-language Office Action issued in counterpart German Application No. 10 2016 202 813.8 dated Nov. 11, 2016 (eight pages).
International Search Report (PCT/ISA/210) issued in PCT Application No. PCT/EP2016/079919 dated Feb. 24, 2017 with English translation (seven pages).
German-language Written Opinion (PCT/ISA/237) issued in PCT Application No. PCT/EP2016/079919 dated Feb. 24, 2017 (nine pages).
International Search Report (PCT/ISA/210) issued in PCT Application No. PCT/EP2016/079916 dated Feb. 17, 2017 with English translation (seven pages).
German-language Written Opinion (PCT/ISA/237) issued in PCT Application No. PCT/EP2016/079916 dated Feb. 17, 2017 (seven pages).
Wikipedia entry for "Demand Response", published Nov. 4, 2015, and retrieved from internet archive wayback machine. Retrieved from the internet on Mar. 24, 2020, URL <https://web.archive.org/web/20151104060401/https://en .wikipedia.org/wiki/Demand_response> (Year: 2015) (13 pages).

* cited by examiner

METHOD AND CENTRAL CONTROL SYSTEM FOR CONTROLLING THE ELECTRICAL CHARGING OF A GROUP OF VEHICLES

CROSS REFERENCE TO RELATED APPLICATIONS

This application is a continuation of PCT International Application No. PCT/EP2016/079916, filed Dec. 6, 2016, which claims priority under 35 U.S.C. § 119 from German Patent Application No. 10 2016 202 816.2, filed Feb. 24, 2016, the entire disclosures of which are herein expressly incorporated by reference.

This application contains subject matter related to U.S. application Ser. No. 16/109,863, entitled "Method for Controlling Electrical Charging of a Group of Vehicles" and Ser. No. 16/109,882, entitled "Method for Controlling the Electrical Charging of a Group of Vehicles" both filed on even date herewith.

BACKGROUND AND SUMMARY OF THE INVENTION

The invention relates to a method for controlling the electrical charging of a group of vehicles, and to a corresponding control system.

From the prior art it is known to control the charging of the energy stores of a group or pool of electrically powered vehicles using a control system, in such a way that the requirements of the operator of the power network to be used are taken into account in regard to a reduction in performance. In other words, given a corresponding requirement of the electricity network operator, the charging of certain vehicles of the vehicle pool can be interrupted or delayed, in order to reduce the power consumption in the power network. In this case, the charging is suspended only for those vehicles for which the interruption of the charging process will have no effect on a departure time specified by the vehicle user, i.e. even with a later resumption of the charging operation there will still be enough time to charge the vehicle fully or up to a specified charging state.

In the above method, in which the charging of a vehicle pool is controlled in order to compensate for overloads in the power network, it may still be the case that a power reduction requested by the power network operator cannot be achieved by interrupting the charging operations of the vehicle-side energy stores, since in order to comply with departure times the charging can only be suspended for a small number of vehicles.

The object of the invention is therefore to control the process of charging a group of vehicles, in such a way that the process of charging a large number of vehicles can be interrupted upon the request of a power network operator.

This and other objects are a method according to the invention used to control the electrical charging of a group of vehicles, which are electrically connected to a power network of a power network operator, wherein the respective vehicles draw electricity from the power network to charge a vehicle-side electrical energy store for powering the vehicle. In other words, the vehicles are electrically powered vehicles, such as pure electric vehicles or hybrid vehicles. In the method according to the invention, a central control system can communicate with the respective vehicles of the group, and with a server of the power network operator. A central control system in this context is understood to mean a control system or a control device, which controls the charging of all the vehicles of the group. This control system is implemented in particular by means of software on a corresponding server. The central control system is able to suspend the charging of at least some of the vehicle-side energy stores in response to a received reduction command, which originates from the server of the power network operator and defines a power amount by which the power consumption of the group of vehicles from the power network must be reduced.

In the method according to the invention, a charging time window, a departure time and a target charging state (preferably the fully charged state) of the vehicle-side energy store at the departure time are defined in advance for each of one or more specific vehicles of the group. Also, during the charging process of the vehicle-side energy store in accordance with the charging time window a charging time criterion is fulfilled, such that (i.e. on fulfilment of the charging criterion) the charging process takes place entirely within the charging time window or contains the entire charging time window, while at the same time it is ensured that the target charging state is reached not later than the departure time. In addition, a cost value for the charging time window is defined according to a cost function, which specifies a cost level as a function of the charging process according to the charging time window. The cost function can be selected differently, wherein it preferably reflects the monetary costs of electricity for the corresponding charging process, as will be mentioned below.

The above-mentioned pre-defined values are known to the central control system, i.e. they are stored in a corresponding memory of the control system. In particular, the pre-defined values, at least in part, are specified and/or transmitted to the control system upon connecting the corresponding vehicle to the power network. According to the above definition, a specific vehicle is understood to mean such a vehicle from the group of vehicles in which the charging time window, the departure time and the target charging state are defined in advance.

In the method according to the invention, the central control system transmits a modified charging time window to a specific vehicle of at least some of the specific vehicles. In this case, the charging process is carried out according to the modified charging time window by fulfilling the charging time criterion with an unchanged departure time and target charging state, i.e. the departure time and charging state defined in advance remain the same and in accordance with the above definition, the charging time criterion is taken into account from then on based on the modified charging time window. The modified charging time window is characterized by the fact that it contains at least one time segment, which occurs before the beginning of the non-modified (i.e. determined in advance) charging time window. In addition, the cost value in accordance with the cost function for the modified charging time window is less than or equal to the cost value for the non-modified charging time window. For specific vehicles, in which the charging time windows are not modified, the charging process is carried out in accordance with the non-modified charging time window. The implementation of the charging process of the respective vehicles is preferably controlled solely by the corresponding vehicle, but possibly also with the involvement of the central control system.

With the method according to the invention it is ensured that pre-specified charging time windows are suitably brought forward when charging vehicles of a vehicle group, without the costs for the charging process or the departure time being affected. Therefore, in the event of a reduction command from the power network operator, on average more vehicles will be available.

In a preferred embodiment of the method according to the invention, the charging time window and/or the departure time and/or the target charging state for a particular vehicle, which are defined in advance, are user-specific data which a user of the specific vehicle has entered on a terminal (e.g. a mobile phone), wherein this data is transmitted from the terminal to the central control system.

The costs in accordance with the cost function can be defined differently depending on the application. Preferably, the cost function depends on the monetary electricity costs for a charging process in accordance with the charging time window and/or on the quantity of exhaust gas generated by the power network during the charging process in accordance with the charging time window, and/or on the proportion of renewable energies which are used by the power network during the charging process in accordance with the charging time window. The cost level in accordance with the cost function is greater, the greater are the monetary electricity costs and/or the quantity of exhaust gas and/or the smaller the proportion of renewable energies used. The quantity of exhaust gas is preferably related to the quantity $CO^2$ produced, but may also relate to other exhaust gases, such as nitrogen oxides, or may take account of these other exhaust gases.

In a particularly preferred embodiment of the method according to the invention, in the event that the central control system suspends the charging of the vehicle-side energy store of a specific vehicle in response to a reduction command, a new charging time window, which differs from the charging time window currently being used, is transmitted by the central control system to the specific vehicle, wherein the beginning of the charging time window occurs after a specified time interval of the suspension of the charging, and the charging process in accordance with the new charging time window otherwise fulfils the above charging time criterion with an unchanged departure time and target charging state. It is thus ensured that a specified target charging state at a corresponding departure time is achieved even in the event of an interruption of the charging process for the vehicle-side energy store in question.

In another preferred embodiment of the method according to the invention, in the event that the central control system suspends the charging of the vehicle-side energy store of a vehicle without a pre-defined charging time window (i.e., of a vehicle which is not a specific vehicle) in response to a reduction command, a predetermined charging time window is transmitted from the central control unit to the vehicle, wherein the beginning of the predetermined charging time window occurs after the period of the suspension of the charging. In an alternative design, in the predetermined charging time window the vehicle-side energy store is charged without taking account of a departure time. Alternatively, it is also possible that the charging process according to the predetermined charging time window fulfils the charging time criterion with a given departure time and given target charging state. The departure time may be a notional departure time, if appropriate. The specified target charging state can be specified in advance and in particular corresponds to the fully charged state of the energy store.

In a preferred alternative design of the two embodiments just described, the new and/or the predetermined charging time window contains a buffer, which takes into account a reduced charging efficiency compared to an expected charging efficiency of the vehicle-side energy store, in order to prevent the vehicle-side energy store from starting the charging before the beginning of the new or the predetermined charging time window. This will prevent the new charging time window from possibly conflicting with the period of the suspension of the charging of the energy store.

In a further preferred alternative design of the method according to the invention, all modified charging time windows are reset to the charging time windows defined in advance after a predetermined number of reduction commands has been processed by the central control system.

In a further, particularly preferred embodiment of the method according to the invention, a static energy storage system is connected to the power network. This static energy storage system is preferably a static battery storage unit, which is controlled by the central control system in such a way that in the event that the reduction of the power consumption of the group of vehicles by the amount of power in accordance with a reduction command cannot be achieved exclusively by suspending the charging of energy stores of the respective vehicles, the power consumed from the power network by the static energy storage system is reduced, or else the power output of the static energy storage system into the power network is increased, so that the reduction of the power consumption of the group of vehicles, which is achieved by suspending the charging of the respective vehicles, plus the amount of the reduction in power consumption or the increase in power output of the static energy storage system corresponds to the amount of power in accordance with the reduction command. With this alternative design of the invention, an inadequate power reduction of vehicle-side energy stores is compensated by a static energy store system.

In addition to the method described above, the invention relates to a central control system for controlling the electrical charging of a group of vehicles, which are electrically connected to a power network of a power network operator, wherein the respective vehicles draw electric current for charging a vehicle-side energy store for powering the respective vehicle, wherein the central control system can communicate with the respective vehicles, as well as with a server of the power network operator. The central control system is able to suspend the charging of at least some of the vehicle-side energy stores in response to a received reduction command, which originates from the server of the power network operator and defines a power amount by which the power consumption of the group of vehicles from the power network must be reduced.

The central control system is designed in such a way that in the central control system, in each case a charging time window, a departure time and a target charging state of the vehicle-side energy store at the departure time are defined in advance for one or more specific vehicles of the group, wherein during the charging process of the vehicle-side energy store in accordance with the charging time window a charging time criterion is fulfilled, so that the charging process takes place entirely within the charging time window or contains the entire charging time window, while at the same time it is ensured that the target charging state is reached not later than the departure time, wherein a cost value for the charging time window is defined in accordance with a cost function, which specifies a cost level as a function of the charging process according to the charging time window.

The central control system is further designed in such a way that the central control system transmits a modified charging time window to a respective specific vehicle of at least some of the specific vehicles, whereupon the charging process is carried out according to the modified charging time window by fulfilling the charging time criterion with an unchanged departure time and target charging state, wherein the modified charging time window contains at least one time interval which occurs before the beginning of the non-modified charging time window and wherein the cost value (KW') in accordance with the cost function for the modified charging time window is less than or equal to the cost value for the non-modified charging time window.

The control system just described is preferably designed in such a way that it can perform one or more preferred variants of the method according to the invention.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
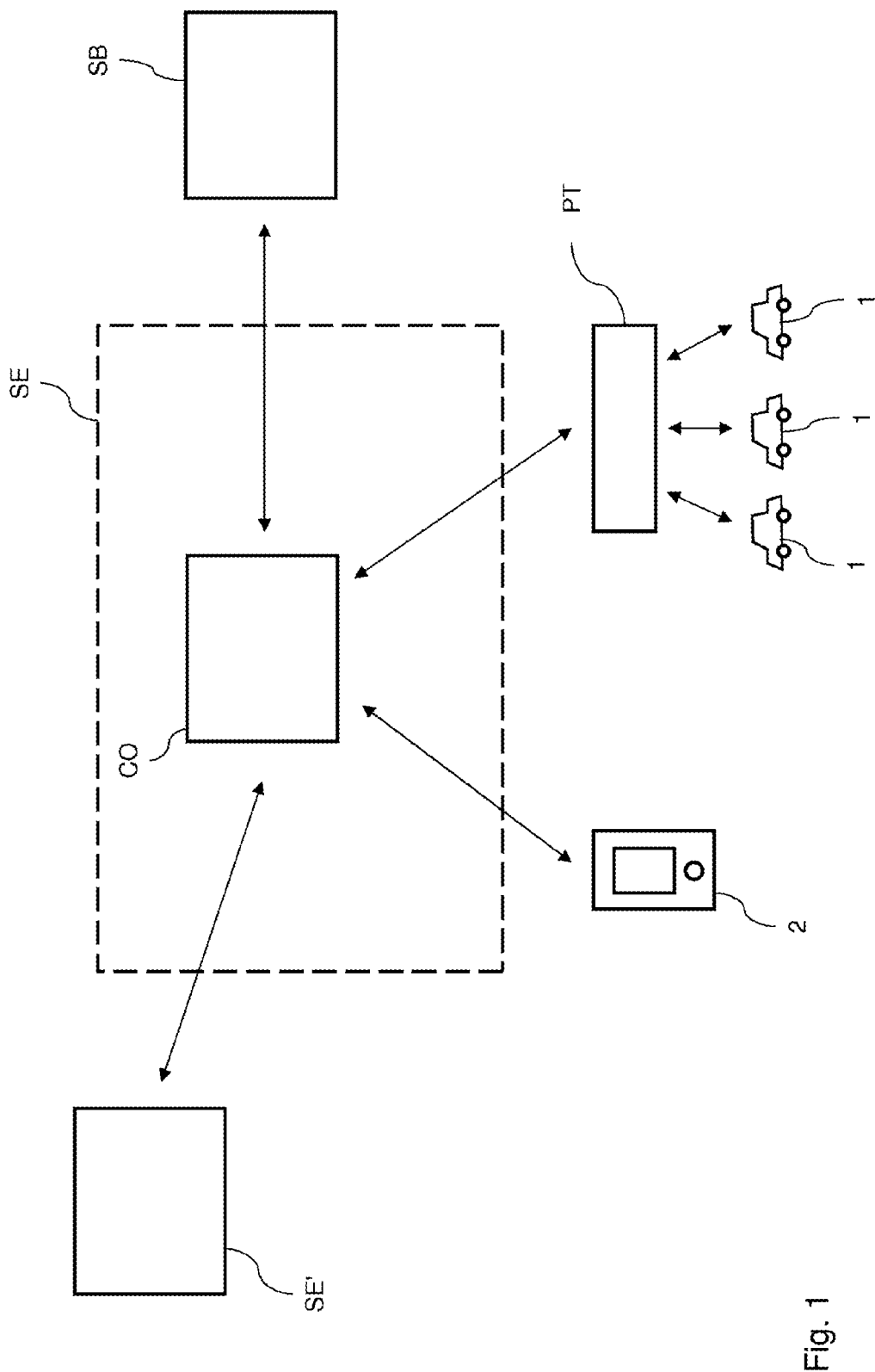
FIG. 1 is a schematic illustration of an infrastructure in which an embodiment of the method according to the invention is implemented.

FIG. 1 shows a schematic representation of an infrastructure for implementing the method according to the invention. A core component of this infrastructure is a central control unit CO, which is integrated in a server SE and used to control the charging of a fleet of a plurality of electrically powered vehicles (i.e. the drive batteries of these vehicles). As an example, three electric vehicles 1 from this vehicle fleet are shown. These vehicles are connected by communication techniques to the control unit CO via a portal PT. The control system CO has access via a suitable control back-end (not shown) to the portal PT, which in turn can communicate with the individual vehicles 1, for example via SMS. By means of the communication path via the portal PT, a charging time window can be transmitted from the control system CO to the individual vehicles 1, as described below.

Each vehicle 1 in the vehicle fleet is associated with a user who has a smartphone 2, wherein for reasons of clarity only a single smartphone is indicated. With this smartphone, the user can communicate with the control system CO via the control backend, not shown here, and on the other hand, with his/her vehicle via the portal PT. In particular, when charging the drive battery of the vehicle via a power network, the user can specify a charging time window, in which the charging is particularly inexpensive. The battery is then preferably charged in the charging time window. The user can also define a departure time and the target charging state at the departure time (usually 100%). This information is sent via the smartphone 2 both to the central control system CO and to the vehicle 1 of the user.

The control system CO according to FIG. 1 also communicates with a server SE', which belongs to a power network operator on whose power network the vehicles 1 of the vehicle fleet or their batteries are charged. In addition, in the infrastructure of FIG. 1 an energy storage system is provided in the form of a static battery storage unit SB, which can be controlled using the control system CO by means of a suitable interface and which belongs to the operator of the control system CO. The operator of the control system, for example, is the manufacturer of the vehicles 1 of the vehicle fleet.

An objective of the infrastructure of FIG. 1 is that the power network operator can send commands via its server SE' to the control system CO in the event of overload in its power network, whereupon in a suitable way, the control system suspends the charging of at least some of the vehicles 1 currently being charged for a specified time interval, to reduce the load in the power network. The suspension period in the embodiment described here is specified permanently and has a value of one hour. The charging process is only suspended for those vehicles in which it is certain that after the resumption of the charging process after the period of suspension, enough time is still available until the departure time to allow the drive battery of the corresponding vehicle to be charged to the target charging state. In order to ensure that the suspension of the charging process is possible in the maximum number of vehicles, as part of the method described here, for at least some of the vehicles 1 a charging time window specified by the user of the respective vehicle in advance is brought forward in time, without increasing the costs of the charging.

Figure 2:
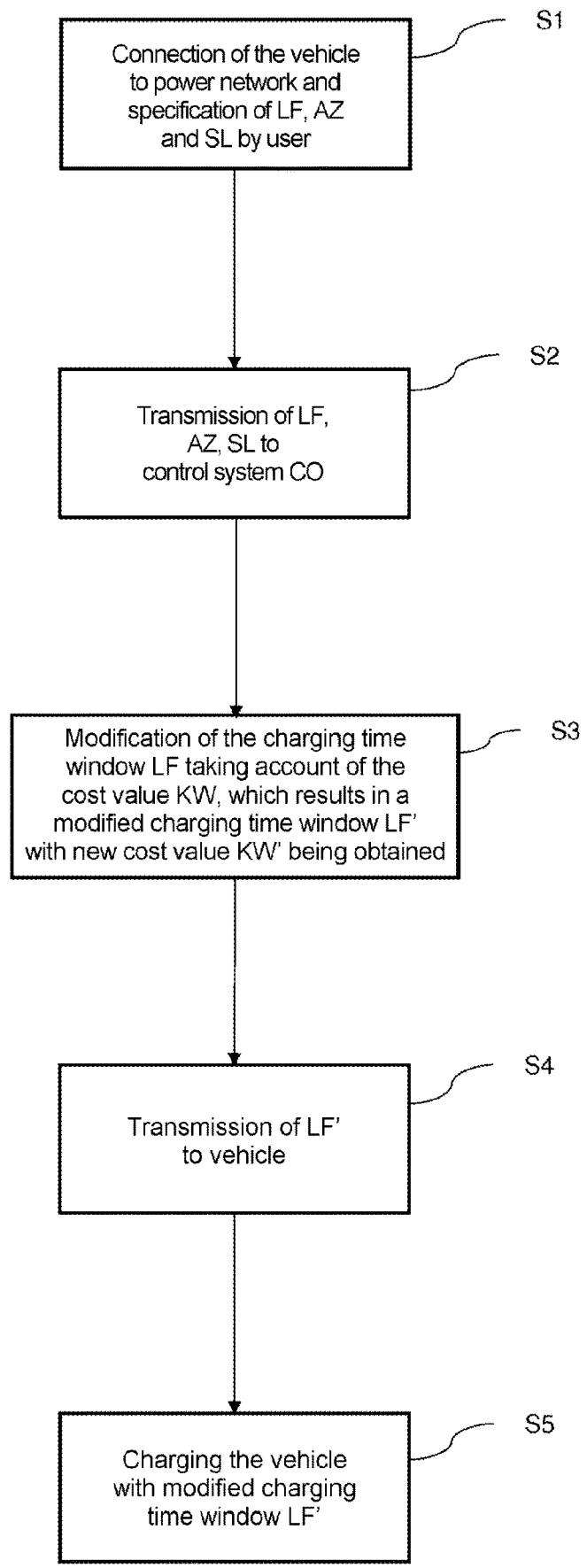
FIG. 2 is a flow diagram, which illustrates the sequence of an embodiment of the method according to the invention.

FIG. 2 shows a flow diagram which illustrates the steps for shifting the charging time based on a single vehicle of the vehicle fleet. According to step S1 of FIG. 2, the user connects his/her vehicle via an appropriate charging station to the power network of the power network operator, which also operates the server SE' of FIG. 1. By means of a suitable app on his/her smartphone 2, the user specifies a charging time window LF, in which the vehicle is to be charged, since in this charging period the electricity provided is particularly inexpensive. In addition, the user defines a future departure time AZ and a target charging state SL, which should be achieved in the drive battery at the departure time. If necessary, for example, the target charging state for the corresponding user can be defined in advance, so that the user does not need to specify this target charging state again using the app.

In step S2, the charging time window LF, the departure time AZ and the target charge state SL are transmitted to the central control system CO via the infrastructure of FIG. 1. Conventionally, the vehicle belonging to the user is then charged over the pre-defined charging time window LF, in such a way that the charging process of the drive battery lies entirely within the charging time window or contains the entire charging time window while, at the same time, it is ensured that the target charging state SL is reached not later than the departure time AZ of the vehicle. According to the invention, the charging time window LF is then modified by the control system CO, as shown in step S3 of FIG. 2.

In accordance with step S3, in the modification of the charging time window LF, a cost value KW that specifies the costs of charging when using the charging time window LF is taken into account. In the embodiment described here these costs are the electricity costs for the corresponding charging process in accordance with the charging time window LF. Alternatively or in addition, by using a suitable cost function, the costs can take into account other factors, such as the $CO_2$ emissions of the power network operator, or the proportion of renewable energy sources in supplying the power for a charging process. The cost value KW of the embodiment described here is higher, the higher are the electricity costs. Specifically, the charging time window LF in step S3 is modified in such a way that at least one time segment of the modified charging time window LF' occurs before the start of the non-modified charging time window LF. The charging process in accordance with the modified charging time window LF' is again structured in such a way that the charging process occurs entirely within the charging time window LF' or contains the entire charging time window LF', while at the same time it is ensured that the target charging state is reached not later than the time of departure. The modified charging time window LF' has also been chosen in such a way that it is cost-neutral, i.e. the cost value KW' that is obtained for the modified charging time window LF' when charging with this charging time window, i.e. the electricity price for this charging process is exactly equal to, or possibly less than, the cost value KW of the non-modified charging time window.

Finally, in step S4, the modified charging time window LF' is transmitted to the user's vehicle, whereupon the charging process of the vehicle in step S5 is performed not with the original charging time window LF, but with the modified charging time window LF', wherein the departure time AZ and the target charging state SL remain unchanged. In this way, at least part of the charging process is brought forward, without negatively affecting the costs of the charging process. Bringing forward the charging time window increases the likelihood that in the event of a corresponding command issued by the power network operator from the server SE', the charging process of the vehicle in question can be interrupted for the specified time interval. The reason for this is that it is more likely that when the charging process is resumed after the suspension period there will still be sufficient time available in order to achieve the target charging state no later than the departure time of the vehicle.

Figure 3:
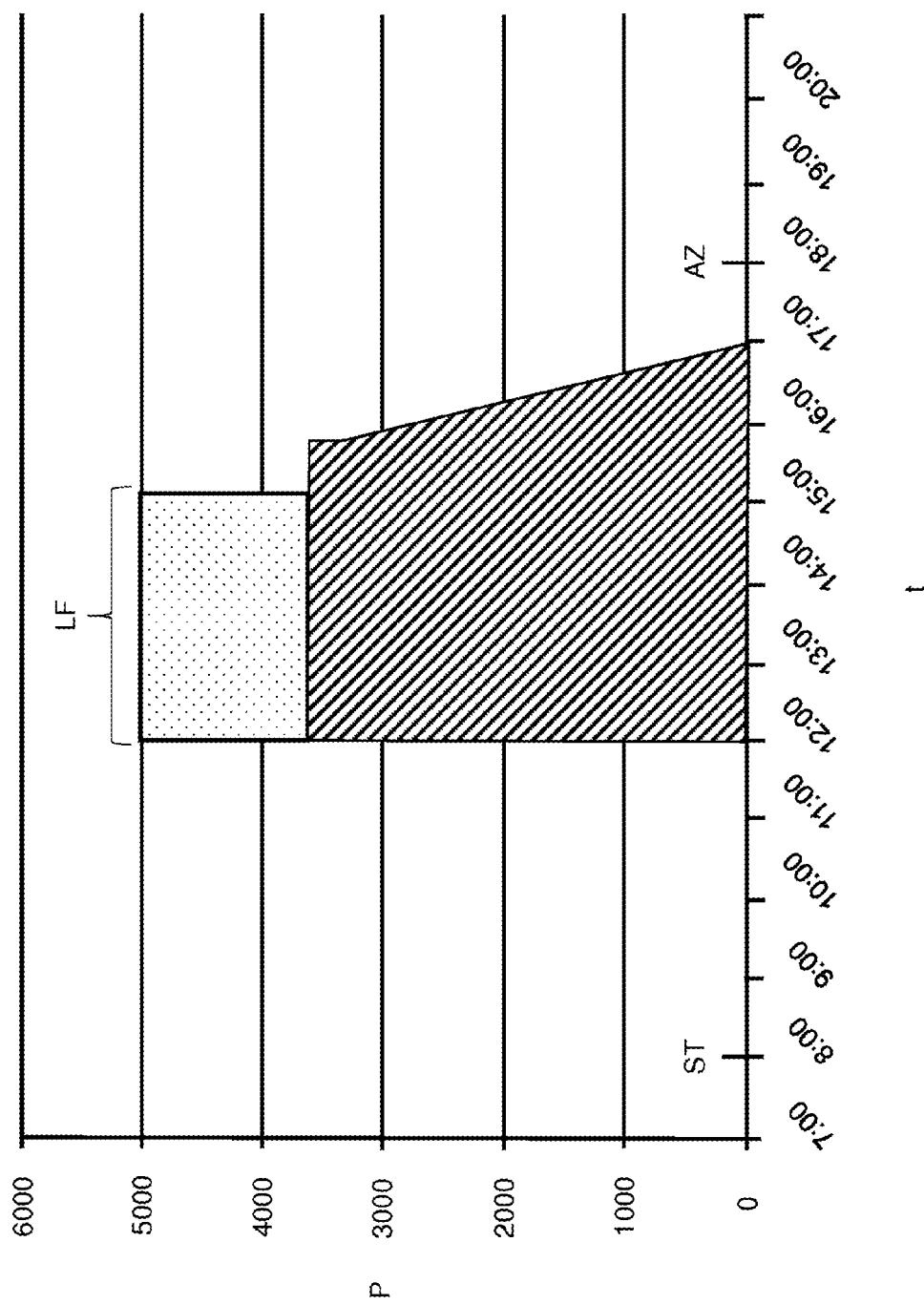
FIG. 3 to FIG. 6 are diagrams which reproduce different variants of the modification of charging time windows.
Figure 5:
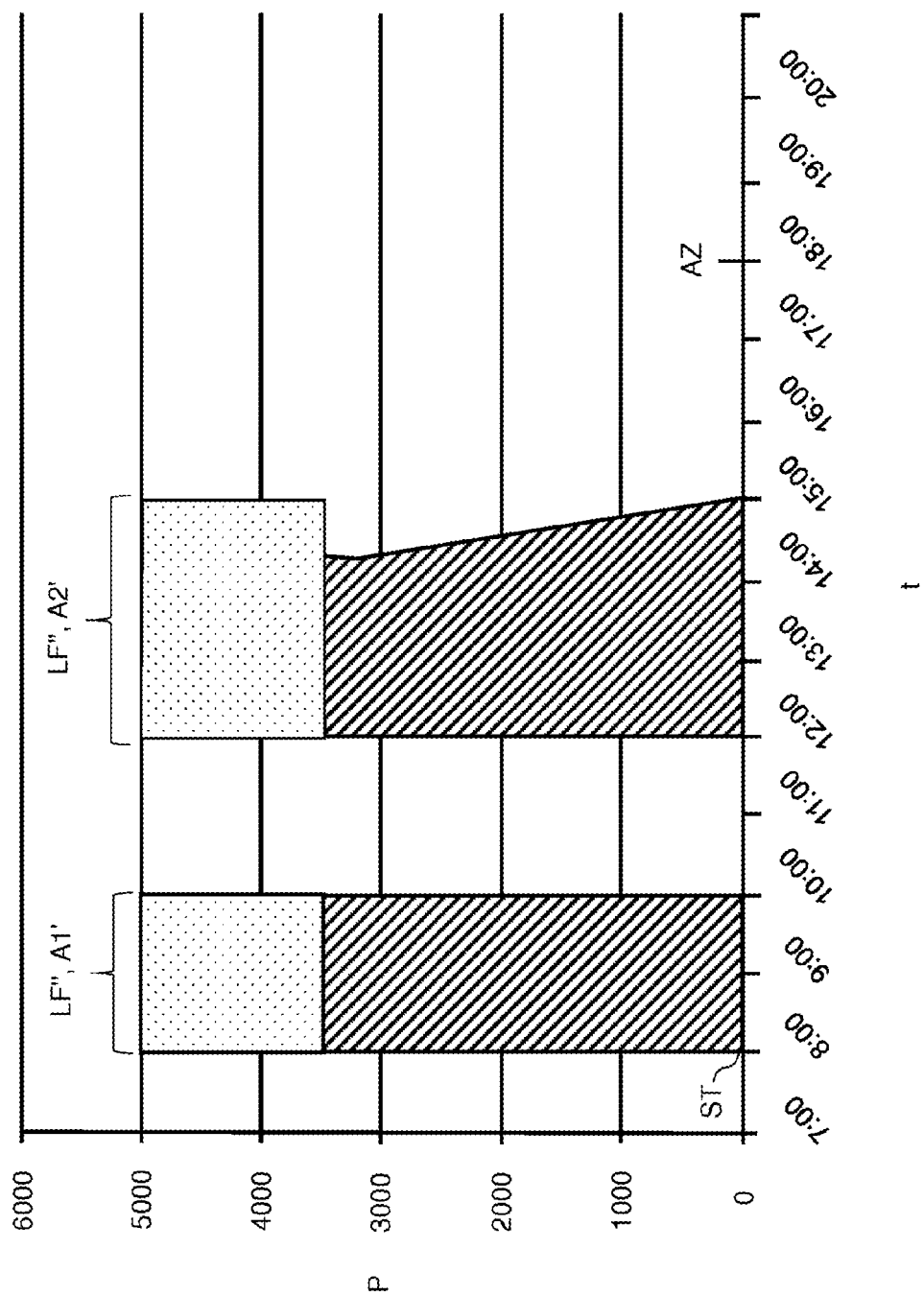

FIG. 3 and FIG. 5 show different scenarios for the definition of a charging time window. In these figures, the time of day t is shown along the abscissa and the charging power P of the drive battery in a corresponding vehicle along the ordinate. In all figures, a block with angled hatching indicates the charging process (i.e. the power consumption) of the drive battery, and a dotted block indicates the charging time window. It should be noted in this connection that the height of the block for the charging time window does not represent the charging power P. In fact, only the width of the corresponding dotted block is relevant, which corresponds to the size of the charging time window.

FIG. 3 shows the charging with the charging time window LF originally stored in the vehicle. In this case, the vehicle was connected to the power network at time ST (08:00). The departure time AZ was set to 18:00 by the vehicle user. In accordance with the charging time window, the charging process is chosen such that it starts at the beginning of the charging time window at 12:00 and ends at 17:00 on reaching the target charging state, which in the embodiment described here is 100%. The charging process in this case is longer than the charging time window, since at the end of the charging time window at 15:00 the target charging state is not yet reached. In the scenario of FIG. 3, the electricity price is cheapest in the charging time window LF, in other words, the electricity price is more expensive outside of the charging time window LF than within the charging time window. As is also apparent from FIG. 3, a degradation of the drive battery occurs at the end of the charging process, i.e. the power consumption decreases significantly at the end of the charging process.

Figure 4:
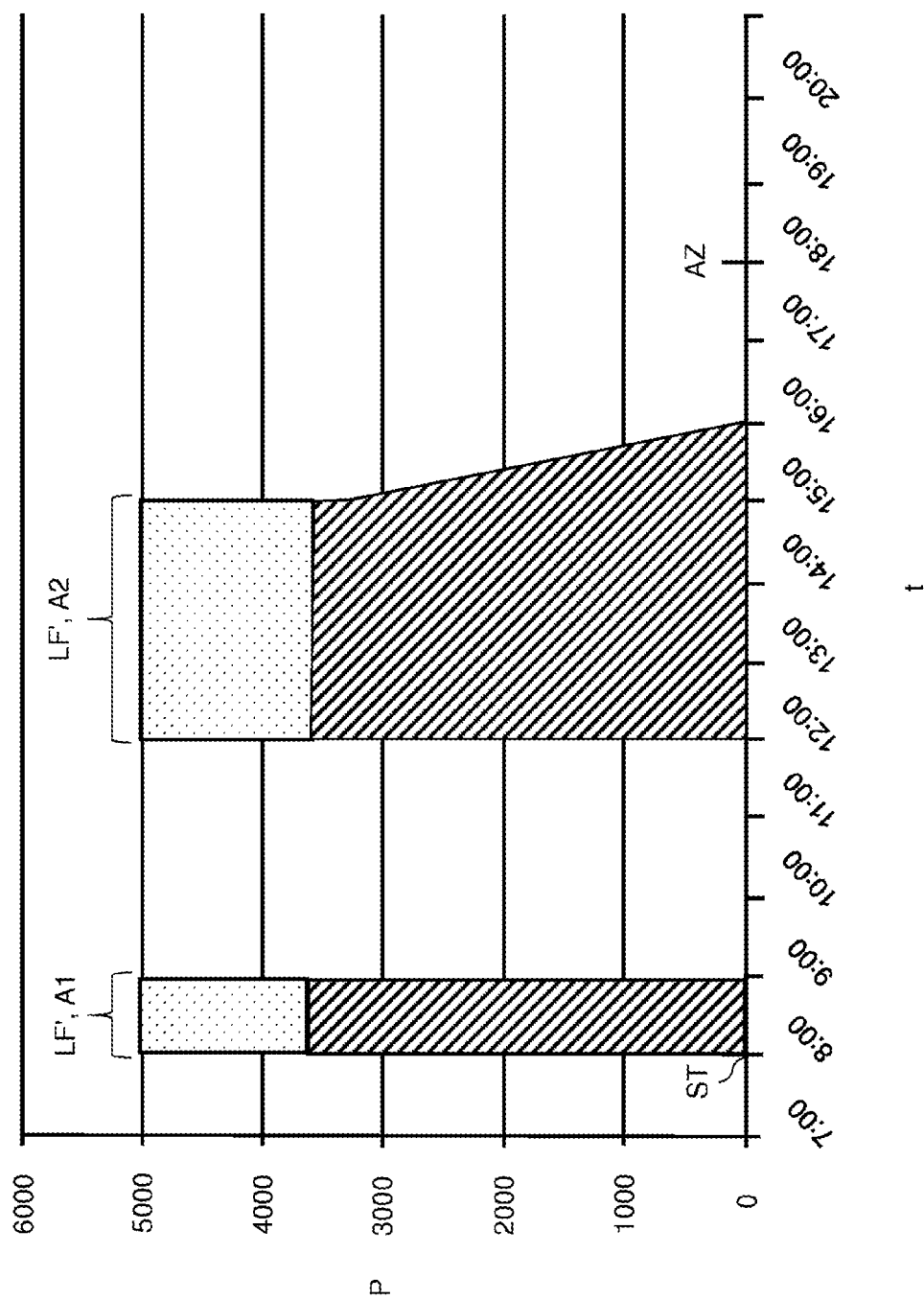

FIG. 4 shows a modification of the charging time window LF carried out with the method according to the invention, allowing a modified charging time window LF' to be obtained which is divided into an advanced time segment A1 and a later time segment A2. The charging time window LF' was obtained in such a way that the time section of the charging process directly following the end of the charging time window LF of FIG. 3, in which no degradation has yet occurred, is brought forward to the time ST of the connection of the vehicle for charging. The charging process with the charging time window LF' is cost-neutral, because in the segment A2, which corresponds to the charging time window LF of FIG. 3, charging will continue to take place without degradation. In other words, the costs of the charging process using the charging time window LF' is just as high as for the charging time window LF of FIG. 3. For comparison, FIG. 5 shows a modification of the charging time window, which—in contrast to the method according to the invention—leads to an increase in the costs of the charging process. In FIG. 5 the modified charging time window is labelled with LF'' and includes the segments A1' and A2'. In this case, a larger section A1' of the charging process has been brought forward to the time ST than in FIG. 4. As a consequence, the rear part of the segment A2' of the charging time window LF'' lies within the region of degradation of the vehicle battery. As a result, less charging takes place in the period of the cheap electricity price, so that the electricity costs are increased.

Figure 6:
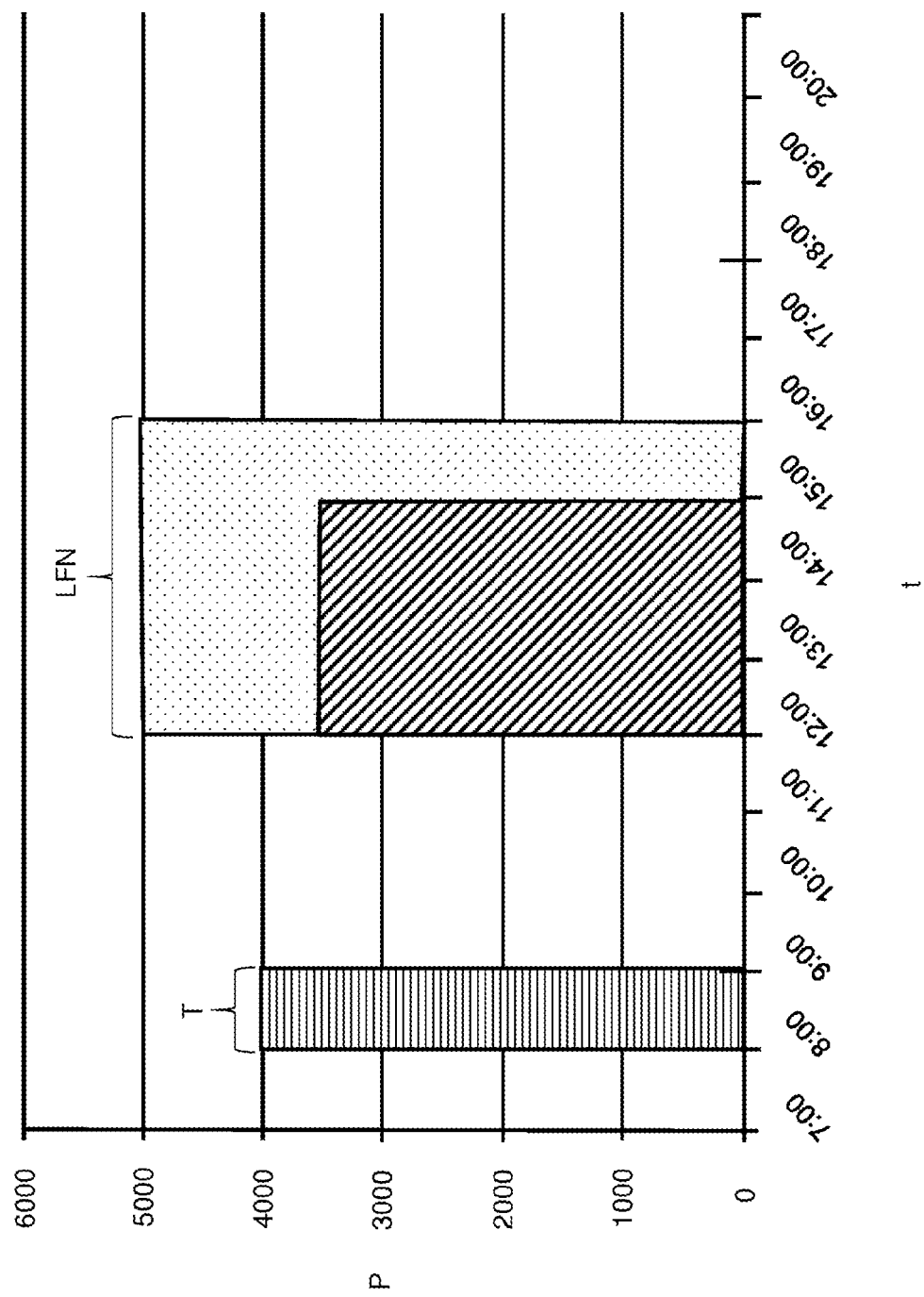

FIG. 6 shows a diagram of the general case similar to the previous FIGS. 3 to 5, illustrating the displacement of a charging time window due to a suspension of the charging process. The period of suspension of the charging process is indicated here by the bar with the horizontal hatching and denoted by T. The suspension of the charging process is based on a command from the server SE' from FIG. 1. The command specifies the amount by which the power for charging the vehicle is to be reduced. In the event that a charging process is suspended, a fixed suspension time interval of one hour is specified in advance. In the scenario of FIG. 6, the charging time window originally included the time interval T. As a result of the suspension of the charging process, the time window is shifted into the future. This displaced time window is the time window LFN of FIG. 6. Only part of the time window is used during the charging process. This is the consequence of the fact that in the definition of the displaced charging time window LFN a certain buffer has been added, which can anticipate a lower projected efficiency of charging of the corresponding vehicle battery. This buffer prevents the vehicle from starting to charge before the beginning of the charging time window due to a charging time window which is too small.

In a further alternative design of the method according to the invention, the charging process is also stopped in those vehicles in the pool for which no charging time window is defined, but which are in the so-called immediate-charging mode. In accordance with this mode, the vehicle is charged up to the target charging state immediately after connection to the power network without consideration of charging time windows or departure times. In this case, when the charging is suspended due to a command from the server SE', a charging time window and a notional departure time are defined. The charging process is again designed in such a way that the time of the charging process occurs within the charging time window, or contains the charging time window, while at the same time it is ensured that the target charging state is reached not later than the departure time.

The static battery store SB shown in FIG. 1 in the embodiment described here is only used if the power reduction specified by the command of the server SE' cannot be met by the batteries of the vehicles in the vehicle pool. In this case, a corresponding power consumption from the power network or power output into the power network is used, so that the desired reduction of the power in the power network is obtained.

In an alternative design of the method according to the invention, a quota is specified, i.e. a number of consecutive commands which are sent by the power network to the control system for power reduction. If this quota is reached, appropriately modified charging time windows are reset to the original settings of the vehicle users again.

The embodiments of the invention described in the foregoing have a number of advantages. In particular, the invention enables the control of the charging of a pool of vehicles using a common control system, in such a way that, in the event of requests by a power network, a plurality of vehicles can interrupt their charging process without customer requirements with regard to the costs of a charging process or the departure time of the corresponding vehicle having to be modified. The vehicle pool can therefore be used to suitably compensate for overloads in a power network.

LIST OF REFERENCE NUMERALS

1 Vehicles
2 smartphone
CO central control system
SE, SE' servers
SB static battery store
PT portal
LF, LF', LF", LFN charging time windows
AZ departure time
SL target charging state
t time of day
P power
ST time of connection of the vehicle to the power network
A1, A2, A1, A2' segments of charging time windows
T time interval of the suspension of the charging The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for controlling electrical charging of a group of vehicles, which are electrically connected to a power network of a power network operator, wherein respective vehicles of the group draw electric current from the power network to charge a vehicle-side energy store for powering the respective vehicle, wherein a central control system can communicate with the respective vehicles of the group and with a server of the power network operator, wherein the central control system can suspend the charging of at least a portion of the vehicle-side energy stores in response to a received reduction command which originates from the server of the power network operator, and specifies an amount of power by which the power consumption of the group of vehicles from the power network is to be reduced, wherein the method comprises the steps of:

in each case a charging time window, a departure time and a target charging state of the vehicle-side energy store at the departure time are defined in advance for one or more specific vehicles of the group, wherein during the charging process of the vehicle-side energy store of the specific vehicle in accordance with the charging time window, a charging time criterion is fulfilled so that the charging process takes place entirely within the charging time window or contains the entire charging time window, while at the same time it is ensured that the target charging state is reached not later than the departure time, wherein a cost value for the charging time window is predefined in accordance with a cost function, which specifies a cost level as a function of the charging process according to the charging time window;

the central control system transmits a modified charging time window to a respective specific vehicle of at least some of the specific vehicles, whereupon the charging process is carried out according to the modified charging time window by fulfilling the charging time criterion with an unchanged departure time and target charging state, wherein the modified charging time window comprises at least one time interval which occurs before a beginning of the charging time window that has not been modified and wherein the cost value in accordance with the cost function for the modified charging time window is less than or equal to the cost value for the charging time window that has not been modified.

2. The method as claimed in claim 1, wherein
the charging time window, the departure time and/or the target charging state for a particular vehicle, which are defined in advance, are user-specific data which a user of the specific vehicle has entered on a terminal, wherein this data is received by the central control system from the terminal.

3. The method as claimed in claim 1, wherein
the cost function depends on: (i) monetary electricity costs for the charging process in accordance with the charging time window, (ii) a quantity of exhaust gas generated by the power network during the charging process in accordance with the charging time window, and/or (iii) a proportion of renewable energies which are used by the power network during the charging process in accordance with the charging time window, wherein the cost level according to the cost function is greater, the greater are the monetary electricity costs, the quantity of exhaust gas and/or the smaller the proportion of renewable energies used.

4. The method as claimed in claim 1, wherein
in the event that the central control system suspends the charging of the vehicle-side energy store of a specific vehicle in response to a reduction command, a new charging time window, which differs from the charging time window currently being used, is transmitted to the specific vehicle, wherein a beginning of the new charging time window occurs after a specified time interval of the suspension of the charging, and the charging process in accordance with the new charging time window otherwise fulfils the charging time criterion with an unchanged departure time and target charging state.

5. The method as claimed in claim 1, wherein
in the event that the central control system suspends the charging of the vehicle-side energy store of a vehicle without a predefined charging time window in response to a reduction command, a predetermined charging time window is transmitted from the central control system to the vehicle, wherein a beginning of the predetermined charging time window occurs after the period of suspension of the charging, wherein in the predetermined charging time window the charging of the vehicle-side energy store is performed without taking into account a departure time, or wherein the charging process in accordance with the predetermined charging time window fulfils the charging time criterion at a predefined arrival time and specified target charging state.

6. The method as claimed in claim 4, wherein the new and/or the predetermined charging time window contains a buffer, which takes into account a reduced charging efficiency compared to an expected charging efficiency of the vehicle-side energy store, in order to prevent the vehicle-side energy store from starting the charging before the beginning of the new or predetermined charging time window.

7. The method as claimed in claim 5, wherein the new and/or the predetermined charging time window contains a buffer, which takes into account a reduced charging efficiency compared to an expected charging efficiency of the vehicle-side energy store, in order to prevent the vehicle-side energy store from starting the charging before the beginning of the new or predetermined charging time window.

8. The method as claimed in claim 1, wherein after a predetermined number of reduction commands have been processed by the central control system, all modified charging time windows are reset to the charging time windows that were defined in advance.

9. The method as claimed in claim 1, wherein a static energy storage system is connected to the power network, which is controlled by the central control system in such a way that in the event that the reduction of the power consumption of the group of vehicles by the amount of power in accordance with a reduction command cannot be achieved exclusively by suspending the charging of energy stores of the respective vehicles, the power consumed from the power network by the static energy storage system is reduced, or else the power output of the static energy storage system into the power network is increased, so that the reduction of the power consumption of the group of vehicles, which is achieved by suspending the charging of the respective vehicles, plus the amount of the reduction in power consumption or the increase in power output of the static energy storage system corresponds to the amount of power in accordance with the reduction command.

10. A central control system for controlling electrical charging of a group of vehicles, which are electrically connected to a power network of a power network operator, wherein respective vehicles of the group draw electric current to charge a vehicle-side energy store for powering the respective vehicle, wherein the central control system communicates with the respective vehicles and with a server of the power network operator, wherein the central control system can suspend charging of at least a portion of the vehicle-side energy stores in response to a received reduction command which originates from the server of the power network operator, and specifies an amount of power by which the power consumption of the group of vehicles from the power network is to be reduced, the central control system comprising:
a central control unit operatively configured to:
define, in each case a charging time window, a departure time and a target charging state of the vehicle-side energy store at the departure time, in advance for one or more specific vehicles of the group, wherein during the charging process of the vehicle-side energy store in accordance with the charging time window, a charging time criterion is fulfilled so that the charging process takes place entirely within the charging time window or contains the entire charging time window, while at the same time it is ensured that the target charging state is reached not later than the departure time, wherein a cost value for the charging time window is predefined in accordance with a cost function, which specifies a cost level as a function of the charging process according to the charging time window;

transmit a modified charging time window to a respective specific vehicle of at least some of the specific vehicles, whereupon the charging process is carried out according to the modified charging time window by fulfilling the charging time criterion with an unchanged departure time and target charging state, wherein the modified charging time window comprises at least one time interval which occurs before a beginning of the charging time window that has not been modified and wherein the cost value in accordance with the cost function for the modified charging time window is less than or equal to the cost value for the charging time window that has not been modified.

11. The central control system as claimed in claim 10, wherein the charging time window, the departure time and/or the target charging state for a particular vehicle, which are defined in advance, are user-specific data which a user of the specific vehicle has entered on a terminal, wherein this data is received by the central control unit from the terminal.

12. The central control system as claimed in claim 10, wherein the cost function depends on: (i) monetary electricity costs for the charging process in accordance with the charging time window, (ii) a quantity of exhaust gas generated by the power network during the charging process in accordance with the charging time window, and/or (iii) a proportion of renewable energies which are used by the power network during the charging process in accordance with the charging time window, wherein the cost level according to the cost function is greater, the greater are the monetary electricity costs, the quantity of exhaust gas and/or the smaller the proportion of renewable energies used.

13. The central control system as claimed in claim 10, wherein in the event that the central control unit suspends the charging of the vehicle-side energy store of a specific vehicle in response to a reduction command, a new charging time window, which differs from the charging time window currently being used, is transmitted to the specific vehicle, wherein a beginning of the new charging time window occurs after a specified time interval of the suspension of the charging, and the charging process in accordance with the new charging time window otherwise fulfils the charging time criterion with an unchanged departure time and target charging state.

14. The central control system as claimed in claim 13, wherein the new and/or the predetermined charging time window contains a buffer, which takes into account a reduced charging efficiency compared to an expected charging efficiency of the vehicle-side energy store, in order to prevent the vehicle-side energy store from starting the charging before the beginning of the new or predetermined charging time window.

15. The central control system as claimed in claim 10, wherein
in the event that the central control unit suspends the charging of the vehicle-side energy store of a vehicle without a predefined charging time window in response to a reduction command, a predetermined charging time window is transmitted from the central control unit to the vehicle, wherein a beginning of the predetermined charging time window occurs after the period of suspension of the charging, wherein in the predetermined charging time window the charging of the vehicle-side energy store is performed without taking into account a departure time, or wherein the charging process in accordance with the predetermined charging time window fulfils the charging time criterion at a predefined arrival time and specified target charging state.

16. The central control system as claimed in claim 15, wherein
the new and/or the predetermined charging time window contains a buffer, which takes into account a reduced charging efficiency compared to an expected charging efficiency of the vehicle-side energy store, in order to prevent the vehicle-side energy store from starting the charging before the beginning of the new or predetermined charging time window.

17. The central control system as claimed in claim 10, wherein
after a predetermined number of reduction commands have been processed by the central control unit, all modified charging time windows are reset to the charging time windows that were defined in advance.

18. The central control system as claimed in claim 10, wherein
a static energy storage system is connected to the power network, which is controlled by the central control unit in such a way that in the event that the reduction of the power consumption of the group of vehicles by the amount of power in accordance with a reduction command cannot be achieved exclusively by suspending the charging of energy stores of the respective vehicles, the power consumed from the power network by the static energy storage system is reduced, or else the power output of the static energy storage system into the power network is increased, so that the reduction of the power consumption of the group of vehicles, which is achieved by suspending the charging of the respective vehicles, plus the amount of the reduction in power consumption or the increase in power output of the static energy storage system corresponds to the amount of power in accordance with the reduction command.

* * * * *